United States Patent [19]

Shedd et al.

[11] Patent Number: 4,696,967

[45] Date of Patent: Sep. 29, 1987

[54] THERMOPLASTIC ELASTOMER COMPOSITIONS

[75] Inventors: Charles D. Shedd, Blairstown; David J. Anzini, Hampton Township, Hunterdon County, both of N.J.

[73] Assignee: BP Performance Polymers Inc., Hackettstown, N.J.

[21] Appl. No.: 926,888

[22] Filed: Nov. 6, 1986

Related U.S. Application Data

[63] Continuation-in-part of Ser. No. 736,547, May 21, 1985, abandoned.

[51] Int. Cl.⁴ .................. C08L 23/10; C08L 33/04; C08L 23/26; C08K 3/22
[52] U.S. Cl. .................. 524/437; 524/523; 524/91; 525/193; 525/194; 525/208; 525/214; 525/221; 525/227
[58] Field of Search .............. 525/194, 227, 221; 524/4.7, 91

[56] References Cited

U.S. PATENT DOCUMENTS

| | | | |
|---|---|---|---|
| 4,143,099 | 3/1979 | Duncan | 525/194 |
| 4,202,801 | 5/1980 | Petersen | 260/5 |
| 4,212,797 | 7/1980 | Matsuda et al. | 260/33.6 |
| 4,340,579 | 7/1982 | Greber et al. | 423/625 |
| 4,350,795 | 9/1982 | Bohm et al. | 525/194 |
| 4,455,406 | 6/1984 | Bergault et al. | 525/194 |
| 4,555,546 | 11/1985 | Patel | 525/194 |

FOREIGN PATENT DOCUMENTS 013084 7/1980 European Pat. Off. .
154453 9/1985 European Pat. Off. .

OTHER PUBLICATIONS

Rubber World–"Materials and Compounding Ingredients for Rubber"–5/75, p. 110.

*Primary Examiner*—Carman J. Seccuro
*Attorney, Agent, or Firm*—Rodman & Rodman

[57] ABSTRACT

A low smoke and flame retardant composition comprising an acrylate rubber and a polyolefin resin compatibilized with aluminum trihydrate. The composition can be made by dynamically partially curing blends of acrylate rubber and polyolefin resin with compatibilizing amounts of aluminum trihydrate to yield a thermoplastic elastomer with improved properties at elevated temperatures. The acrylate rubber can comprise an acrylate ester polymer or a copolymer of acrylate ester with ethylene. The polyolefin resin is preferably a high molecular weight polymerization product of either ethylene or propylene, preferably propylene.

19 Claims, 2 Drawing Figures

THERMOPLASTIC ELASTOMER COMPOSITIONS

This is a continuation-in-part of application Ser. No. 736,547, filed May 21, 1985, and now abandoned.

BACKGROUND OF THE INVENTION

1. Field Of The Invention

The present invention relates to thermoplastic elastomer compositions based upon acrylate rubbers with low smoke and flame retardant properties.

2. Description Of The Prior Art

A thermoplastic is usually a linear or branched chain structure which softens and may flow at elevated temperatures. Examples are polyethylene, polystyrene and nylon.

Thermoplastic elastomers, can be processed and fabricated by methods used for thermoplastics. U.S. Pat. No. 3,265,765 to Holden et al, and the article by Hartman et al, "Butyl Grafted to Polyethylene Yields Thermoplastic Elastomer," Rubber World, October 1970, pages 59 to 64 disclose thermoplastic elastomers made by special block copolymerization or polymer grafting methods.

U.S. Pat. No. Re. 31,518 to Fischer discloses thermoplastic elastomer compositions comprising a blend of a monoolefin copolymer rubber and a polyolefin resin. The blend of monoolefin copolymer rubber component and polyolefin resin is made through a dynamic partially curing process. U.S. Pat. No. 4,130,535 to Coran discloses a completely cured blend of olefin rubber and thermoplastic olefin resin.

SUMMARY OF THE INVENTION

The present invention relates to a compatibilized low smoke and flame retardant composition comprising an acrylate rubber, a polyolefin resin and an aluminum trihydrate compatibilizing agent. The composition can be made by dynamically partially curing blends of acrylate rubber and polyolefin resin with compatibilizing amounts of aluminum trihydrate, to yield a thermoplastic elastomer with improved properties at elevated temperatures. The inventive composition can also include high loadings of fillers and still maintain good physical properties.

DESCRIPTION OF THE PREFERRED EMBODIMENTS

Figure 1:
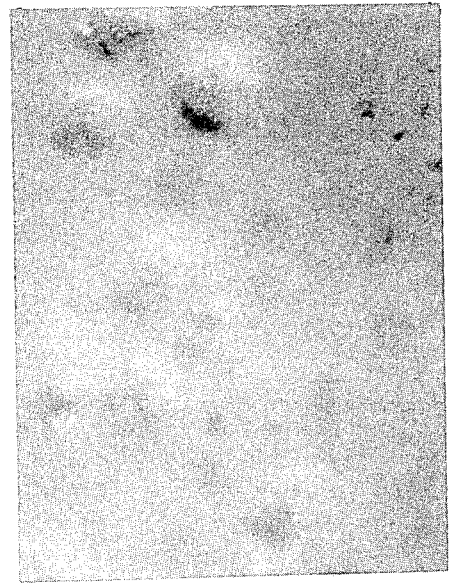

In accordance with the present invention, a thermoplastic elastomer composition comprising an acrylate rubber and a polyolefin resin with compatibilizing amounts of aluminum trihydrate, is provided by dynamically partially curing the blended components with a curing agent wherein the amount of curing agent is less than that required to provide a fully cross-linked composition. The curing agent is contacted with the blended components in amounts sufficient to assure the development of a thermoplastic elastomer which can be molded or otherwise shaped without the necessity for performing an expensive and time consuming vulcanization step in the shaped article. Moreover, the inventive composition can be reprocessed in a manner typical to thermoplastic materials.

The rubber component of the inventive thermoplastic elastomer can comprise polymers of acrylate esters and copolymers of acrylate esters with ethylene. These polymers can also include a small amount of acrylic acid or other copolymerizable or terpolymerizable acid, to facilitate cross linking. U.S. Pat. No. 3,904,588 to Greene discloses the preparation of certain acrylate ester rubbers.

The acrylate ester polymers and copolymers are commercially available under the Vamac ® (DuPont), Cyanacryl ® (American Cyanamid), and Hycar ® (B. F. Goodrich) trademarks.

It has also been found that copolymers of ethylene-propylene rubbers grafted with acrylic acid can also function as the rubber component.

The ethylene/acrylic elastomer is a copolymer of ethylene and methylacrylate plus a cure site monomer, with a structure as follows:

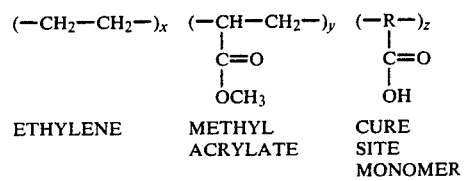

| ETHYLENE | METHYL ACRYLATE | CURE SITE MONOMER |

Polyacrylic rubbers or polyacrylate elastomers have two major components. A "backbone" component comprising 95–99% of the polymer, and the "reactive cure site" component comprising 1–5% of the polymer. The copolymers have high molecular weight, typically about 100,000 Mn (viscosity average molecular weight).

The backbone component is made from monomeric acid esters of primarily two types:

(1) Alkyl

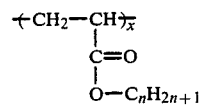

where n=2=ethyl acrylate
where n=4=butyl acrylate and (2) Alkoxy

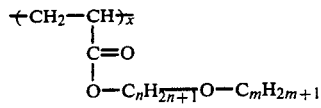

where n=2 and m=1=methoxy ethyl acrylate
where n=2 and m=2=ethoxy ethyl acrylate
The reactive cure-sites are primarily of three types:
(1) reactive halogen

X is a halogen, most commonly chlorine
for example,

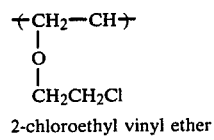

2-chloroethyl vinyl ether (2) epoxy

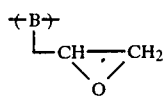

for example

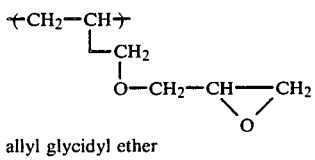

allyl glycidyl ether and
(3) carboxyl

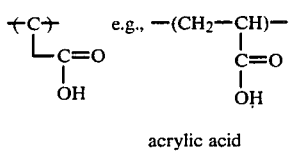

acrylic acid

Suitable polyolefin resins with which the acrylate rubber can be mixed to make the blend of the invention comprise crystalline solid high molecular weight resinous plastic material made by polymerizing such olefins as ethylene, propylene, 1-butene, 1-pentene, 4-methylpentene, 1-hexene, 2-methyl-1-propene, 3-methyl-1-pentene, 5-methyl-1-hexene and mixtures thereof. Commerically available thermoplastic polyolefin resins, such as polyethylene or polypropylene can be used, including linear polyethylene. Polypropylene is the preferred polyolefin, having highly crystalline isotactic and syndiotactic forms. Crystalline block copolymers of ethylene and propylene, which are plastics distinguished from amorphous, random ethylene-propylene elastomers, can also be used, preferably where the ethylene content does not exceed 20%. Included among the polyolefin resins are the higher alpha-olefin modified polyethylenes and polypropylenes as disclosed in "Polyolefins", N. V. Boenig, (Elsevier Publishing Company, New York, 1966).

The propylene polymers are commercially available under the trademark Pro-fax ® from Himont, Inc. The molecular weight of these polymers as indicated by melt flow rate can vary from about 20 dg/min. to 0.2 dg/min. melt flow rate.

The polypropylene component can also be optionally grafted with acrylic acid and is commerically available under the trademark Polybond ® from BP Performance Polymers, Hackettstown, N.J. 07840.

As noted in U.S. Pat. No. 4,555,546 to Patel, olefin polymers and acrylic ester copolymer rubber are not very compatible with each other, and this lack of compatibility has prevented the development of optimum properties in blends of these materials. Patel's approach is to use a polyolefin grafted with acrylate and/or similar rubbers.

In accordance with the present invention, it has been discovered that the inclusion of aluminum trihydrate in a blend of an acrylate rubber and a polyolefin resin imparts compatibility to the blend without adversely affecting mechanical properties such as tensile strength, elongation and impact strength.

The compatibilizing function of aluminum trihydrate is an unexpected characteristic in view of its known function as a filler. A filler is generally used as an inexpensive additive to reduce the cost of the blend. Fillers such as hydrated magnesia, hydrated calcium silicate, clays, talcs, carbonates, carbon blacks, hydrates and oxides are also used to increase specific gravity, improve processing, reinforcement and flame retardance of a polymer, as descerived in Whittington's Dictionary of Plastics, page 33 (Techomic Publishing Co., Westport, CT 1978). Other fillers are listed in Rubber World Magazine Blue Book at pages 253-263 (Lippincott and Peto 1984). Fillers usually reduce the mechanical properties of the polymer such as tensile strength, elongation and impact strength.

Surprisingly, when aluminum trihydrate is used in a blend with acrylate rubber and polyolefin resin, it has a compatibilizing function and actually increases the tensile strength and elongation of the polymer, when compared to a blend with calcium carbonate as a filler, or to a blend without a filler.

An added benefit of the aluminum trihydrate compatibilizing agent, is that it imparts to the thermoplastic elastomer composition of the present invention has a high limiting oxygen index (LOI), and also burns with substantially no visible smoke. The combination of low smoke generation and resistance to burning are very desirable properties for many applications such as insulating cables with a low smoke and flame retardant jacketing, to be used in building construction and in military vehicles.

The curing system used to accomplish the partial cross linking of the acrylate rubber-polyolefin resin can comprise organic peroxides, sulfur, metal alkylates, epoxies, amines, azides, phenolic resin curing agents, metal oxides, quinone derivatives and the like. The particular type of curing agent used depends upon the specific cure site in the polymer and the properties desired in the finished product. Specific examples are disclosed in U.S. Pat. Nos. 3,284,421 to Breslow and 3,297,674 to Breslow et al. Other suitable curing agents are disclosed in the Encyclopedia of Chemical Technology, Volume 17, Second Edition, (Interscience Publishers, 1968), "Science and Technology of Rubber, edited by F. R. Eirich, Chapter 7, pp. 291-335 (Academic Press, 1978), "Rubber Technology," edited by Maurice Morton, Chapter 2, pp. 19-50 (van Nostrand Reinhold, 2nd edition 1973) and "Organic Peroxides", Volume 1, Daniel Severn, (Wiley-Interscience), 1970, and in U.S. Pat. No. Re. 31,518 to Fischer at column 3, line 26 to column 4, line 35, the disclosure of which is incorporated by reference.

As already noted, the amount of elastomeric curing agent or the extent of cross linking imparted to the acrylate rubber portion of the blend is partial. In general, the amount of elastomeric curing agent used will depend upon the extent of thermoplasticity desired in the elastomer composition. The elastomeric curing agent can vary from about 1-90%, preferably about 5-75% and more preferably about 10-40% of the amount necessary for a substantially complete cure of cross linking. The exact amount of elastomer curing agent is determined by the formulator taking into consideration such factors as the final method of fabricating the elastomer and the balance of properties desired for its end use.

In using these limited amounts of curing agents or curatives, the mixing temperature of the blend containing the curing agent and the acrylate rubber-polyolefin resin is selected so that whatever amount of curing agent is employed, it is substantially consumed during the reaction.

An acrylate rubber-polyolefin resin-aluminum trihydrate composition which has the desired degree of improvement in resistance to deformation at elevated temperature and is still processable as a thermoplastic would be considered to have an adequate amount of curing agent.

As a practical rule of thumb, the effective activation temperature for the curing agent may be taken as the temperature at which at least 95% of the curative has been decomposed to yield free radicals within a 0.5 minute time period. It is preferable to select a curative having an activation temperature above the softening point or crystalline melting point of the polyolefin plastic. This temperature is about 270° F. for high density polyethylene, and about 335° F. for polypropylene.

It is also possible to use a curing agent having an activation temperature at or below the softening point of the polyolefin resin. The activation temperature would ordinarily be above 240° F., preferably about 270° F. The maximum activation temperature would ordinarily not be more than 450° F., preferably not greater than 400° F. The data on the common peroxide curatives, such as 2,5-bis(tert-butylperoxy)-2,5-dimethylhexane ("Peroxide I") and dicumyl peroxide ("Peroxide II") is given in the following table.

| Temp., | Half-life in toluene | |
| --- | --- | --- |
| °F. | Peroxide I | Peroxide II |
| 240 | 21 hours | 10.2 hours |
| 270 | 2 hours | 1.75 hours |
| 335 | ca. 5 minutes | ca. 3 minutes |
| 360 | 47 seconds | 22 seconds |
| 390 | 7.2 seconds | 3.6 seconds |

In contrast to the half-life data tabulated above, at 360° F., the time to reach about 95% decomposition for Peroxide I and Peroxide II is approximately 4 minutes and 1½ minutes, respectively.

The dynamic partial cross-linking treatment substantially exhausts the action of the curing agent so that there is little or no tendency for further advancement of cure to take place subsequently. It is also desirable to further insure termination of the action of any remaining cross-linking agent, by adding to the mix, at the end of the dynamic partial curing step, a small amount of a free-radical scavenging agent, such as a stabilizer or antioxidant.

Such stabilizer may be added and mixed in for the last minute of so of mastication. The dynamically partially cured material may be subjected to one or more "refining" passes on a mill, and the stabilizer or antioxidant can be added in the course of or just prior to refining.

A complete cure which would change the characteristics of the composition to one that is non-thermoplastic, would defeat the purpose of the invention.

The relative proportions of acrylate elastomer to polyolefin resin can vary over a wide range. The ratio of acrylate elastomer:polyolefin resin can vary from about 95:5 to 50:50, respectively, in parts by weight. The proportion of aluminum trihydrate can range from about 25 to 250 parts, preferably about 100–175 parts of aluminum trihydrate per 100 parts of thermoplastic elastomer based upon the sum of the parts of the acrylate rubber and the polyolefin resin.

The elastomeric curing agent can be used alone or in combination with auxiliary substances, such as accelerators, activators, stabilizers, free radical scavenging agents, chain extenders and antioxidants. Such materials, for example, include 2,2-4-trimethyl-1,2-dihydroquionoline, diphenylamine acetone condensate, aldol alpha-naphthylamine, octylated diphenylamine, N-phenyl-N'-cyclohexyl-p-phenylene diamine, 2,6-di-tert.-butyl-4-methyl phenol, styrene-resorcinol resin, o-cresol monosulfide, di-p-cresol-2-propane, 2,5-di-tert.-amyl hydroquinone, dilauryl-3,3'-thiodipropionate and similar dialkyl thiodipropionates.

Other suitable additives are listed in "Rubber: Natural and Synthetic," Stern, (Palmerton Publishing Company, New York, 1967), especially at pages 244–256; and also "Chemistry and Technology of Rubber", Davis and Blake (Reinhold, N.Y., 1937).

The partial cure of the elastomeric blend of acrylate rubber, polyolefin resin and aluminum trihydrate is accomplished by contacting the blend, with amounts of the curing or cross-linking agent that are insufficient for a substantially cross-linked cure.

In addition to insuring that the amount of elastomeric curing or cross-linking agent is less than the amount necessary to effect a full cure or cross-linking, parameters such as the curing temperature, and time of cure are also carefully controlled to insure full activation of the curing agent(s) present in the blend.

The curing temperatures for the polyolefin-acrylate rubber aluminum trihydrate elastomer blend can vary from about 160°–400° F., preferably 220°–400° F., and most preferably 320°–400° F. The curing temperatures are limited by the stability of the specific acrylate rubber that is used in the blend. For example, blends of the copolymers of methylacrylate and ethylene with polypropylene cannot be processed at temperatures above about 400° F. or below about 320° F. At temperatures above 400° F., the acrylate degrades and gives off decomposition gases. At temperatures below about 320° F., the polypropylene cannot be processed because it is close to the melting point of the polymer.

Typical cure times can vary from about 1 to 30 minutes, preferably about 3 to 20 minutes, depending upon the cure system and temperature utilized. Naturally, the time required for the dynamic partial cure will vary with such parameters as the particular polymers employed in the blend, the kind and amount of curative, and the temperature at which the partial cure is carried out.

To best accomplish the dynamic partial cure, the acrylate rubber, polyolefin resin, aluminum trihydrate and cure system can be contacted on an open roll mill, or in an internal mixer such as a Banbury mixer, or an extruder-mixer or a transfer mixer.

The processability of the acrylate rubber-polyolefin resin aluminum trihydrate blend can be assessed for different applications by examining test specimens for a surface finish smoothness that is substantially free from obvious imperfections. A non-thermoplastic material has an irregular grain and poor definition as well as lack of sharpness. Although these criteria are qualitative, those skilled in the art are readily able to ascertain satisfactory products from those that are unsatisfactory by visual examination and touch.

The processability of the inventive blends can be evaluated by subjecting samples of the blend to such shaping operations as extrusion, injection molding, or compression molding.

Extrusion is the shaping method of choice where long continuous forms, such as hose, window seals, wire coatings, flat sheets, and the like are described. It is important that the extruded articles have acceptable surface smoothness. Extrudability can be evaluated in accordance with ASTM D 2230.

For satisfactory injection molding, the acrylate rubber-polyolefin resin elastomer material must form in the mold a homogeneous article of uniform strength. The flow viscosity characteristics of such elastomeric blends are adequate to insure filling the mold properly under the operating conditions.

The elastomeric nature of objects shaped from the thermoplastic blend of the present invention can be demonstrated by a low elongation set at break, measured in accordance with ASTM standard D412.

The thermoplastic nature of the inventive blends can be demonstrated by their reprocessability, especially after repeated extrusion with retention of desirable characteristics.

In processing the inventive blend, it is advantageous to include a lubricant, particularly from the standpoint of improving the extrusion quality of the blend composition. For this purpose, any known lubricant conventionally used in rubber or plastics processing can be used, generally in amounts varying from about 0.2 to 3 parts by weight, preferably about 0.5 to 1 part by weight per 100 parts of the acrylate rubber-polyolefin resin blend.

In processing the acrylate rubber-polyolefin resin blend, it has been found that the use of a three component stabilizer system is uniquely suitable in obtaining a desirable product. The first component of the stabilizer system comprises a high molecular weight multi-functional sterically hindered phenol such as tetrakis [methylene 3-(3',5'-di-tert-butyl-4'-hydroxyphenyl)proprionate]methane, more simply referred to as "tetrakis methane", available from Ciba-Geigy Corp. under the trademark Irganox ®1010. The high molecular weight multifunctional sterically hindered phenol functions as an antioxidant and thermal stabilizer.

The second component of the stabilizer system is an alkyl ester of the thiodipropionic acid such as dilauryl thiodipropionate ("DLTDP") which functions as a secondary antioxidant.

The third component of the stabilizer system is a substituted benzotriazole, such as 2-(3',5'-di-tert-butyl-2'-hydroxyphenyl)-5-chlorobenzotriazole available under the trademark Tinuvin ®327 from Ciba-Geigy Corp. and functions in the stabilizer system to protect the elastomeric blend against ultraviolet radiation.

The amount of stabilizer system can vary from about 0.5-5 parts by weight, and more preferably about 1-3 parts by weight of the thermoplastic composition. In the stabilizer system, the ratio of DLTDP to substituted benzotriazole to hindered phenol can vary from about 2-4.5:0.75-1.25:0.75-1.25 and preferably about 4:1:1, respectively, in parts by weight.

The elastomeric blend of the present invention can be manufactured in a single operation, or in a number of operational steps.

In the single step operation, the acrylate rubber, polyolefin resin, aluminum trihydrate and curing agent, and if desired, the filler, are charged at the desired ratio to a suitable mixer such as a Banbury internal mixer, transfer type extruder-mixer, extruder or any device that will enable efficient mastication of the blend at the desired temperature. The blending apparatus can be preheated to reduce the time necessary to reach the processing temperature range.

The blend is then held at the processing temperature while continuing the mixing for a time sufficient to insure that effective partial cure of the blend has been accomplished.

During processing, the stabilizer system is then contacted with the blend and processing is continued for a short time, usually for about 1 minute or more in order to thoroughly incorporate the stabilizer in the blend and for the purpose for deactivating any residual curing agent.

In the multi-step process, the acrylate rubber and curing agent are charged to a suitable apparatus wherein partial curing takes place. Thereafter, the partially cured acrylate rubber is blended with the polyolefin resin, aluminum trihydrate and other components, as needed.

In the following examples, which serve to illustrate the present invention, all parts and percentages are by weight unless otherwise indicated.

EXAMPLES 1 to 11

Various blends of ethylene/methylacrylate elastomer (EMA), aluminun trihydrate (ATH), polypropylene (PP), and an organic peroxide cure system were charged into a Farrel B size Banbury mixer and the ram was dropped. The component proportions for each example of blend are tabulated in Table 1. The Banbury mixer has no auxilliary cooling or heating and is operated in a neutral mode at a speed of 120 rpm, the speed being measured with no load on the mixer. When the batch temperature reached 325° F., the ram was raised and the stabilizer system was added. The ram was dropped again. At a batch temperature of 360° F. the ram was again raised and the batch allowed to turn over for an additional 15 seconds. The batch was then recovered and samples prepared for physical testing were cut from a tape extruded from a laboratory size extruder. The extruder was set to attain a uniform temperature of 375° F. over its entire length. The tape die on the extruder was also set to a temperature of 375° F. The extruder was adjusted to operate at a screw speed of 75 rpm. Sample tapes of approximately 0.030 inch thickness were made and tested for tensile strength and elongation at break in accordance with ASTMD-412, limiting oxygen index (LOI) in accordance with ASTMD D-2863 and smoke generation by visual observation. Physical data for each example is tabulated in Table 2.

TABLE 1

| Example | EMA (a) | EMA (b) | PP (c) | PP (d) | PP (e) | ATH (f) | PEROXIDE CURE(g) | STABILIZER PACKAGE(h) |
|---|---|---|---|---|---|---|---|---|
| 1 | 100 | | 20 | | | 200 | 0.5 | 1.5 |
| 2 | 100 | | | | 30 | 200 | 0.5 | 1.5 |
| 3 | | 100 | 20 | | | 200 | 0.5 | 1.5 |
| 4 | | 100 | | | 30 | 200 | 0.5 | 1.5 |

TABLE 1-continued

| Example | EMA (a) | EMA (b) | PP (c) | PP (d) | PP (e) | ATH (f) | PEROXIDE CURE(g) | STABILIZER PACKAGE(h) |
|---|---|---|---|---|---|---|---|---|
| 5 | | 100 | 50 | | | 200 | 1.0 | 1.5 |
| 6 | | 100 | 30 | | | 100 | 0.5 | 1.5 |
| 7 | | 100 | 30 | | | 150 | 0.5 | 1.5 |
| 8 | | 100 | 50 | | | 200 | 1.5 | 1.5 |
| 9 | | 100 | 50 | | | 200 | 2.0 | 1.5 |
| 10 | | 100 | | 30 | | 200 | 1.0 | 1.5 |
| 11 | | 100 | | | 50 | 200 | 1.0 | 1.5 |

(a) EMA = ETHYLENE/METHYL ACRYLATE ELASTOMER (VAMAC G)
(b) EMA = ETHYLENE/METHYL ACRYLATE ELASTOMER (VAMAC N-123)
(c) PP = 11 MFR (melt flow rate) POLYPROPYLENE (PROFAX 6301)
(d) PP = 0.2 MFR POLYPROPYLENE (PROFAX 6801)
(e) PP = 11 MFR ACRYLIC ACID GRAFTED POLYPROPYLENE (POLYBOND ® 64-111)
(f) ATH = ALUMINUM TRIHYDRATE (MARTINAL 710)
(g) PEROXIDE = ORGANIC PEROXIDE (VAROX)
(h) STABILIZER SYSTEM = A BLEND OF THE FOLLOWING:
DLTDP (4 parts by weight)
IRGANOX 1010 (1 part by weight.)
TINUVIN (1 part by weight)

TABLE 2

PHYSICAL PROPERTIES

| Example | TENSILE STRENGTH PSI (a) | ELONGATION AT BREAK (%) (b) | LIMITING OXYGEN INDEX (LOI) (c) | SMOKE GENERATION WHEN BURNING (d) |
|---|---|---|---|---|
| 1 | 641 | 246 | 44 | NO VISIBLE SMOKE |
| 2 | 483 | 225 | 36 | NO VISIBLE SMOKE |
| 3 | 687 | 188 | 44 | NO VISIBLE SMOKE |
| 4 | 741 | 171 | 39 | NO VISIBLE SMOKE |
| 5 | 1029 | 150 | 34 | NO VISIBLE SMOKE |
| 6 | 822 | 125 | 30 | NO VISIBLE SMOKE |
| 7 | 662 | 108 | 34 | NO VISIBLE SMOKE |
| 8 | 841 | 79 | 34 | NO VISIBLE SMOKE |
| 9 | 825 | 75 | 34 | NO VISIBLE SMOKE |
| 10 | 745 | 225 | 34 | NO VISIBLE SMOKE |
| 11 | 950 | 196 | 35 | NO VISIBLE SMOKE |

(a) Tensile Strength - ASTM D-412
(b) Elongation - ASTM D-412
(c) LOI - ASTM D-2863
(d) Visual Observation

EXAMPLE 12

To demonstrate the unique compatibilizing effect of the aluminum trihydrate on an acrylate rubber-polyolefin resin blend, the properties of the composition of Example 8 were compared with an identical composition where aluminum trihydrate was absent ("8A") and with a blend where calcium carbonate was substituted for the aluminum trihydrate of Example 8 ("8B"). Each blend also contained the same stabilizer as Example 8. The components and properties are tabulated as follows:

| Component (parts by weight) | Example 8 | 8A | 8B |
|---|---|---|---|
| EMA | 100 | 100 | 100 |
| PP | 50 | 50 | 50 |
| ATH | 200 | — | — |
| CaCO3 | — | — | 200 |
| Peroxide | 1.5 | 1.5 | 1.5 |
| Properties: | | | |
| Tensile Strength (psi) | 841 | 820 | 693 |
| Elongation (%) | 79 | 56 | 62 |
| Limiting Oxygen Index (%) | 34 | 20 | 22 |

EXAMPLE 13

The procedure of Example 12 was repeated with the properties of the compositions of Examples 1 and 11 compared with identical compositions where aluminum trihydrate was absent ("1A" and "11A", respectively). Composition "11B" is identical to Example 11 except that calcium carbonate was substituted for the aluminum trihydrate. The components and properties were tabulated as follows:

| Component (parts by weight) | Example 11 | 11A | 11B | Example 1 | 1A |
|---|---|---|---|---|---|
| EMA (a) | — | — | — | 100 | 100 |
| EMA (b) | 100 | 100 | 100 | — | — |
| PP (c) | — | — | — | 20 | 20 |
| PP (d) | 50 | 50 | 50 | — | — |
| ATH | 200 | — | — | 200 | — |
| Peroxide | 1.0 | 1.0 | 1.0 | 0.5 | 0.5 |
| CaCO3 | — | — | 200 | | |
| Properties: | | | | | |
| Tensile Strength (psi) | 950 | 287 | 487 | 641 | Blend is unprocessible and too sticky |
| Elongation (%) | 196 | 87 | 200 | 246 | |
| Limiting Oxygen Index (%) | 35 | 19 | 23 | 44 | |

EXAMPLE 14

The poor physical properties of the polypropyleneacrylic rubber blends which do not contain aluminum trihydrate is amply demonstrated by the results of Examples 12 and 13. To further demonstrate the compatibilizing function of aluminum trihydrate, the composition of Example 1 and an identical composition without aluminum trihydrate was prepared. Each composition was pressed into pellet form in a compression molder set at 400° F. and 30,000 lbs. per square inch. 1 mil thick films of each composition were then cut from each pellet and placed in an optical microscope fitted with a Polaroid camera, and photomicrographs were taken at 30×.

Figure 2:
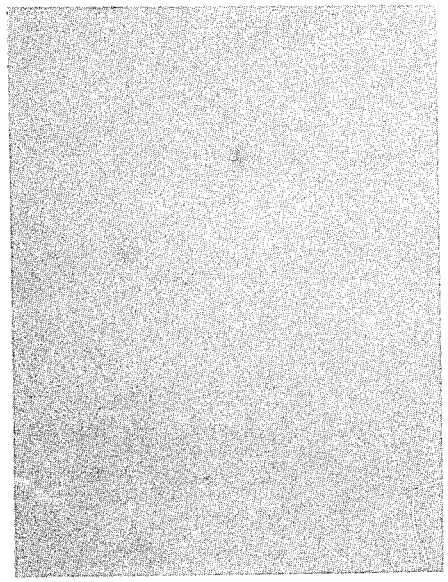

The mottled blend in FIG. 1 is the polypropylene-acrylic rubber blend without aluminum trihydrate and evidences the incompatibility of blends of an acrylic rubber and polyolefin resin. The smooth blend in FIG. 2 is the polypropylene-acrylic rubber blend with aluminum trihydrate and shows the compatibilizing influence of aluminum trihydrate.

What is claimed is:

1. A compatibilized low smoke and flame retardant reprocessable thermoplastic elastomer composition consisting essentially of a partially cured binary polymer blend of an acrylate rubber and a polyolefin resin selected from the group consisting of crystalline propylene homopolymers and copolymers and a compatibilizing amount of aluminum trihydrate, wherein the ratio of acrylate rubber to polyolefin resin varies from about 95:5 to 50:50 respectively, in parts by weight, and the aluminum trihydrate is present in amounts of about 25 to 250 parts per 100 parts of acrylate rubber and polyolefin resin.

2. The composition of claim 1, wherein the acrylate moiety of the rubber consists of $C_1$ to $C_4$ n-alkyl acrylates.

3. The composition of claim 1, wherein the acrylate rubber is selected from the group consisting of polymers of acrylate esters and copolymers of acrylate esters with ethylene.

4. The composition of claim 2, wherein said polymers include acrylic acid or other copolymerizable or terpolymerizable acid.

5. The composition of claim 1, wherein said acrylate rubber is ethylene/methyl acrylate.

6. The composition of claim 1, wherein the acrylate rubber has a molecular weight of about 100,000.

7. The composition of claim 1, wherein the polyolefin is a polymerized propylene selected from the group consisting of isotactic homopolymers of propylene and copolymers of propylene with ethylene.

8. The composition of claim 1, wherein the aluminum trihydrate varies from about 100 to 175 parts per 100 parts of acrylate rubber and polyolefin resin.

9. A method for preparing a compatibilized partially cured low smoke and flame retardant reprocessable thermoplastic elastomer consisting essentially of a binary polymer blend of an acrylate rubber, a polyolefin resin selected from the group consisting of crystalline propylene homopolymers and copolymers, and a compatibilizing amount of aluminum trihydrate comprising: dynamically mixing the acrylate rubber, polyolefin resin and aluminum trihydrate, wherein the ratio of acrylate rubber and polyolefin resin varies from about 95:5 to 50:50, respectively, in parts by weight, and the aluminum trihydrate is present in amounts of about 50 to 250 parts per 100 parts of acrylate rubber and polyolefin resin, and wherein the dynamic mixing is conducted in the presence of an amount of curing agent which is less than that required to provide a fully crosslinked composition.

10. The method of claim 9, wherein the amount of curing agent varies from about 1 to 90% of the quantity necessary to effect a substantially complete cure.

11. The method of claim 10, wherein the amount of curing agent varies from about 5 to 75% of the quantity necessary to effect a substantially complete cure.

12. The method of claim 10, wherein the curing agent is selected from the group consisting of organic peroxides, sulfur, metal alkylates, epoxies, amines, azides, phenolic resins, metal oxides, and quinone derivatives.

13. The method of claim 12, wherein the curing agent is an organic peroxide.

14. The method of claim 9, wherein the curing temperature varies from about 160° to 400° F.

15. The method of claim 9, wherein said acrylate rubber is selected from the group consisting of polymers of acrylate esters and copolymers of acrylate esters with ethylene.

16. The method of claim 9, wherein the polyolefin is a polymerized propylene selected from the group consisting of isotactic homopolymers of propylene and copolymers of propylene with ethylene.

17. The method of claim 9, wherein a stabilizer system is contacted with the thermoplastic blend during processing, said stabilizer system comprising a hindered phenol, a substituted benzotriazole and an alkyl ester of a thiodipropionic acid.

18. The method of claim 9, wherein the aluminum trihydrate varies from about 100 to 175 parts per 100 parts of acrylate rubber and polyolefin resin.

19. The product formed by the method of claim 9.

* * * * *

UNITED STATES PATENT AND TRADEMARK OFFICE
CERTIFICATE OF CORRECTION

PATENT NO. : 4,696,967

DATED : September 29, 1987

INVENTOR(S) : Charles D. Shedd et al.

It is certified that error appears in the above-identified patent and that said Letters Patent is hereby corrected as shown below:

Column 4, line 61, "of" should read -- or --.

Column 7, line 5, "described" should read -- desired --.

Column 8, line 21, "for", second occurrence, should read -- of --.

Column 10, lines 61-62, "polypropylenea-crylic" should read
-- polypropylene-acrylic --.

Signed and Sealed this

Twelfth Day of April, 1988

*Attest:*

DONALD J. QUIGG

*Attesting Officer*  Commissioner of Patents and Trademarks